(12) United States Patent
Roberts et al.

(10) Patent No.: US 6,702,880 B2
(45) Date of Patent: Mar. 9, 2004

(54) INLET SILENCER/FILTER FOR AN OXYGEN CONCENTRATOR

(75) Inventors: Keith Roberts, Stillwater, MN (US); Chaouki Khamis, New Brighton, MN (US)

(73) Assignee: Porous Media Corporation, St. Paul, MN (US)

( * ) Notice: Subject to any disclaimer, the term of this patent is extended or adjusted under 35 U.S.C. 154(b) by 0 days.

(21) Appl. No.: 10/150,299

(22) Filed: May 17, 2002

(65) Prior Publication Data

US 2003/0213368 A1 Nov. 20, 2003

(51) Int. Cl.$^7$ ............................................... B01D 35/14
(52) U.S. Cl. ...................... 96/381; 55/385.2; 55/413; 55/486; 55/497; 181/231; 181/256
(58) Field of Search ........................... 96/381; 55/385.2, 55/413, 497, 486; 181/231, 229, 252, 256

(56) References Cited

U.S. PATENT DOCUMENTS

| | | | | |
|---|---|---|---|---|
| 4,072,210 A | * | 2/1978 | Chien | 184/5 |
| 5,996,731 A | * | 12/1999 | Czabala et al. | 181/229 |
| 6,126,721 A | * | 10/2000 | Nemser et al. | 95/54 |

FOREIGN PATENT DOCUMENTS

EP          0542178 A1 * 5/1993 ................. 417/312

* cited by examiner

*Primary Examiner*—Robert A. Hopkins
(74) *Attorney, Agent, or Firm*—Marshall & Melhorn, LLC (57) ABSTRACT

An improved inlet silencer/filter for an oxygen concentrator includes a HEPA filter and an adjoining chamber for receiving air flow from the HEPA filter. The chamber is surrounded on one face by the HEPA filter, and by sound absorbing padding on at least 4 other faces. Air is forced from the HEPA filter, through the open chamber and then through the sound absorbing padding by a flow restrictor plate. Air flows from here through air channels and into an open chamber leading to an outlet from the air silencer/filter.

13 Claims, 7 Drawing Sheets

INLET SILENCER/FILTER FOR AN OXYGEN CONCENTRATOR

BACKGROUND OF THE INVENTION

1. Field of the Invention

The present invention relates to filters and filter housings. More particularly, the present invention relates to an oxygen concentrator air compressor inlet filter for medical applications, preferably with noise reducing properties.

2. Description of the Prior Art

Oxygen concentrators are used in medical applications for increasing the oxygen concentration of air, typically atmospheric air, and processing it into a relatively pure source of oxygen. Atmospheric air typically contains about 21% oxygen and 78% nitrogen, with remaining trace gases including carbon dioxide, hydrocarbons and helium. Oxygen concentrators are devices that generate relatively pure oxygen by utilizing an air compressor, typically operating at between 40 and 60 psig, with filters such as a molecular sieve bed, which purify the atmospheric air into concentrated oxygen. The oxygen content can be typically increased to the range of about 90–95% after concentration.

Oxygen concentrators as described above are generally used in home or hospital type environments. Two significant problems tend to arise with the use of these compressors. First, these compressors tend to generate a significant amount of noise, and even after sound damping they tend to be excessively noisy. Despite the fact that the compressor and associated components are typically housed in sound insulated containers, the sound generated is often excessive, especially for the environments in which the oxygen concentrators are used, e.g. hospitals, nursing homes, home health care etc. Second, the compressor tends to be subject to excessive wear from atmospheric particles which contaminate the system, thereby decreasing the service life of the machinery, while increasing maintenance time and expense.

Typically, these issues are dealt with by a filter used upstream of the compressor to filter particles and to protect the compressor and the patient from bacteria present in the atmosphere. HEPA filters are commonly used in these applications, and they are rated to remove 99.97% of the particles 0.3 $\mu$m or larger. These filters typically employ a large surface area (about 120 square inches of surface filtration area) and provide a long service life. In addition, a muffler is also typically used to mask the noise generated by the filter. Often polyurethane foam or felt is used as the muffler. The muffler material and the filter are generally contained within the concentrator compartment and must be easily accessible as the filter media will need to be changed due to particle loading of the filter media.

An example of a known filter by American Gases includes a housing with a slotted opening on one end for the input air. The air passes through a HEPA filter and then through a felt pad positioned under the HEPA filter. A second opening abuts the felt pad and serves as the outlet opening. A space is maintained between the bottom of the felt pad and the bottom of the housing. This space is necessary in order to maintain proper air flow characteristics (e.g. avoid an unacceptably high pressure drop) through the filter. The fact that the felt is on the direct downstream side of the HEPA filter is a deficiency of this design. Despite the fact that this arrangement maximizes dirt holding capacity and provides sufficient oxygen output levels (over the useful life of the filter), this device does not allow the maximum possible amount of sound attenuating material to reduce the ambient noise generated by the oxygen concentrator. Additionally, this design leaves undamped solid, flat plastic walls off of which sound can reverberate and echo within the housing.

Another example of a known filter is by Malinckrodt Medical. This filter contains two separate chambers separated by a flow passage. The first chamber includes a housing, with four walls, but open top and bottom. The top consists of an inlet opening covered by a felt pad. The opposite wall of this chamber contains an outlet, with felt surrounding the outlet, and extending to the walls of the housing. The outlet itself is not covered by felt. The outlet of this chamber leads to a second chamber which includes a HEPA filter. This chamber then contains an outlet leading to the patient. While this filter produces improved acoustic characteristics, it provides a separate set of problems. Specifically, this design provides a relatively small amount of felt (about 11 square inches of surface area) compared to the surface area of the pleated HEPA filter (about 120 square inches.) This can cause the filter to become clogged with particles much more rapidly than other known designs. An additional difficulty of this filter is that because of the rapid increase of surface area (11 square inches of felt compared to 120 square inches of HEPA filter), this device can cause lowered oxygen output levels, which is unacceptable, and can be dangerous for this type of application. In order for airflow to remain at an acceptable level, the felt must be frequently changed, which can add greatly to material and labor costs.

An earlier filter manufactured by Porous Media (part number DBF25 filter/silencer) and marketed by Invacare (PN 1071274) includes a rectangular housing, with top and bottom that are convex as opposed to flat as in the other filters described. While this filter demonstrates acceptable filtering performance, the acoustic damping properties could still be improved.

SUMMARY OF THE INVENTION

The present invention overcomes these disadvantages of the prior art in an improved inlet silencer/filter for an oxygen concentrator. The improved filter includes a housing with an inlet and an outlet. The inlet is positioned so that the air flows through a first region or chamber of the housing-upon entry. This first chamber is filled with a HEPA filter. Abutting the HEPA filter, in the air flow path, is a second region or chamber within the housing. This chamber has a felt pad lining at least three walls of the chamber, and a further felt pad extending the length and breadth of the second chamber, on the side of the second chamber away from the HEPA filter. The air exits the second chamber into a third region or chamber, directly underneath the second chamber, which is an open air passage. This air passage includes air restrictors or "fins" longitudinally positioned in the air flow path. These restrictors extend from the bottom of the felt pad to the bottom of the housing. The air exits from this third chamber to a fourth region or chamber, the fourth chamber abutting an end of the first, second and third chambers. The fourth chamber is in fluid communication with the third chamber, but is separated from the first and second chambers by a baffle plate, which blocks the flow of air from either the first or the second chamber directly to the fourth chamber. The fourth chamber also has an outlet in the housing for air exiting the filter A mesh filter can also be positioned in the fourth chamber, at the outlet. This configuration provides additional surface area of felt for noise reduction, while also maintaining improved flow characteristics (i.e. minimizing pressure drop) of air through the silencer/filter.

Therefore, it is an object of the present invention to design a silencer/filter for oxygen concentrators with improved sound damping characteristics from those known in the art.

It is an additional object of the present invention to design a silencer/filter for oxygen concentrators with improved filtering properties.

A further object of the present invention is to design a silencer/filter for oxygen concentrators that exhibit increased service life, thereby decreasing maintenance time and expense.

Yet another object of the present invention is to design a silencer/filter for oxygen concentrators which maintains an acceptable air pressure (i.e. minimizes pressure drop) while adequately removing contaminates and minimizing noise.

DETAILED DESCRIPTION OF THE PREFERRED EMBODIMENT

Figure 1:
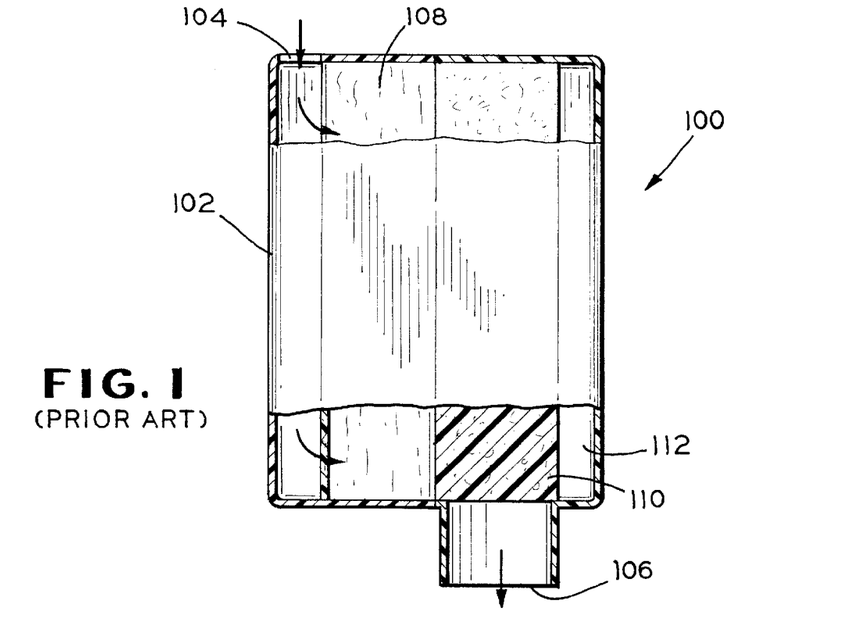
FIG. 1 is an elevational view, partially cut away, of a known inlet filter of the prior art.

FIG. 1 illustrates a known inlet air filter 100 for an oxygen concentrator. The filter 100 includes a housing 102 with an air inlet 104 and an air outlet 106. After air comes in the inlet 104, it is then forced through a HEPA filter 108. Below the HEPA filter 108, and adjacent to the air outlet 106, is a felt pad 110 for sound absorption. As shown on FIG. 1, there is a further open area 112 inside the housing 102 and below the felt pad 110. As the felt pad 110 is adjacent the outlet 106, the open area 112 is not in the direct air flow to the outlet 106, although some air can flow through this area.

Figure 2:
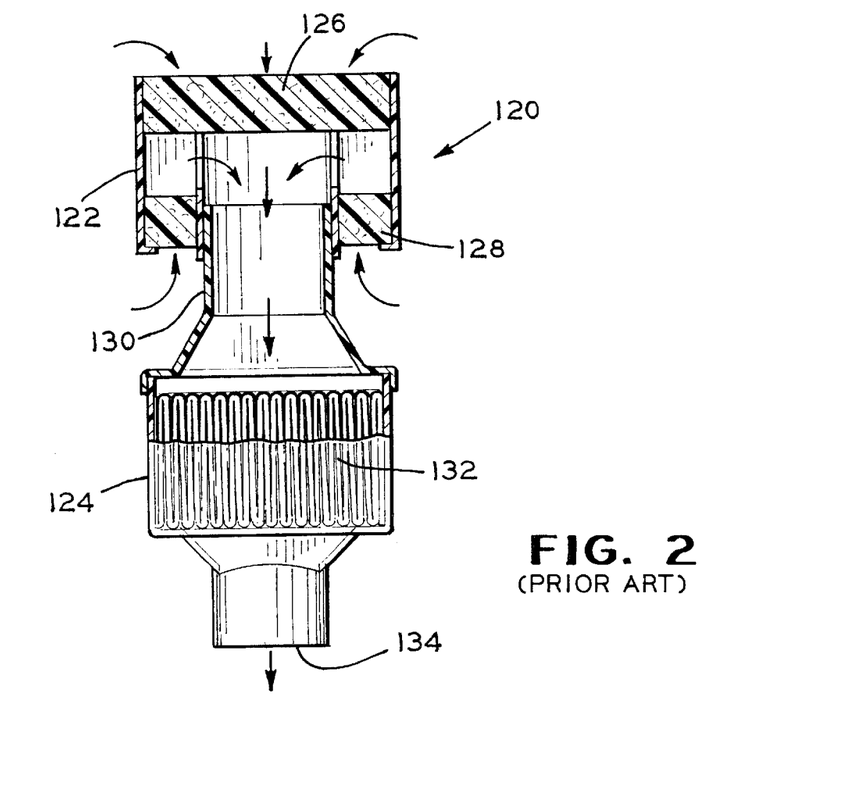
FIG. 2 is an elevational view, partially cut away, of an additional known inlet filter of the prior art.

Another known air filter is depicted in FIG. 2. This air filter 120 has a first housing 122 and a second housing 124. Air is drawn into the first housing 122 through felt pads 126, 128. Felt pad 128 includes an opening through which a connecting section 130 connects the first housing 122 to the second housing 124. Inside the second housing 124 is a HEPA filter 132. The second housing also contains an outlet 134 for air to exit the filter/silencer 120.

An advantage of this design is that it allows a greater amount of air to be input to the first housing 122, as air can enter through either of the felt pads 126, 128. However, this filter is often inadequate because of the greatly reduced surface area of the felt pads 126,128 compared to the surface area of the HEPA filter 132. This can cause an early clogging of the filter, and thus, an unacceptably short service life of the filter. Additionally, the lowered surface area can cause an unacceptable pressure drop, resulting in a greatly decreased flow rate of oxygen. Because of the medical uses of the oxygen concentrator, this decreased flow of oxygen is unacceptable, and thus provides a serious drawback to the use of this filter. To maintain a sufficiently low pressure drop, the felt pads 126, 128 must be changed frequently, increasing the maintenance costs of operation.

Figure 3:
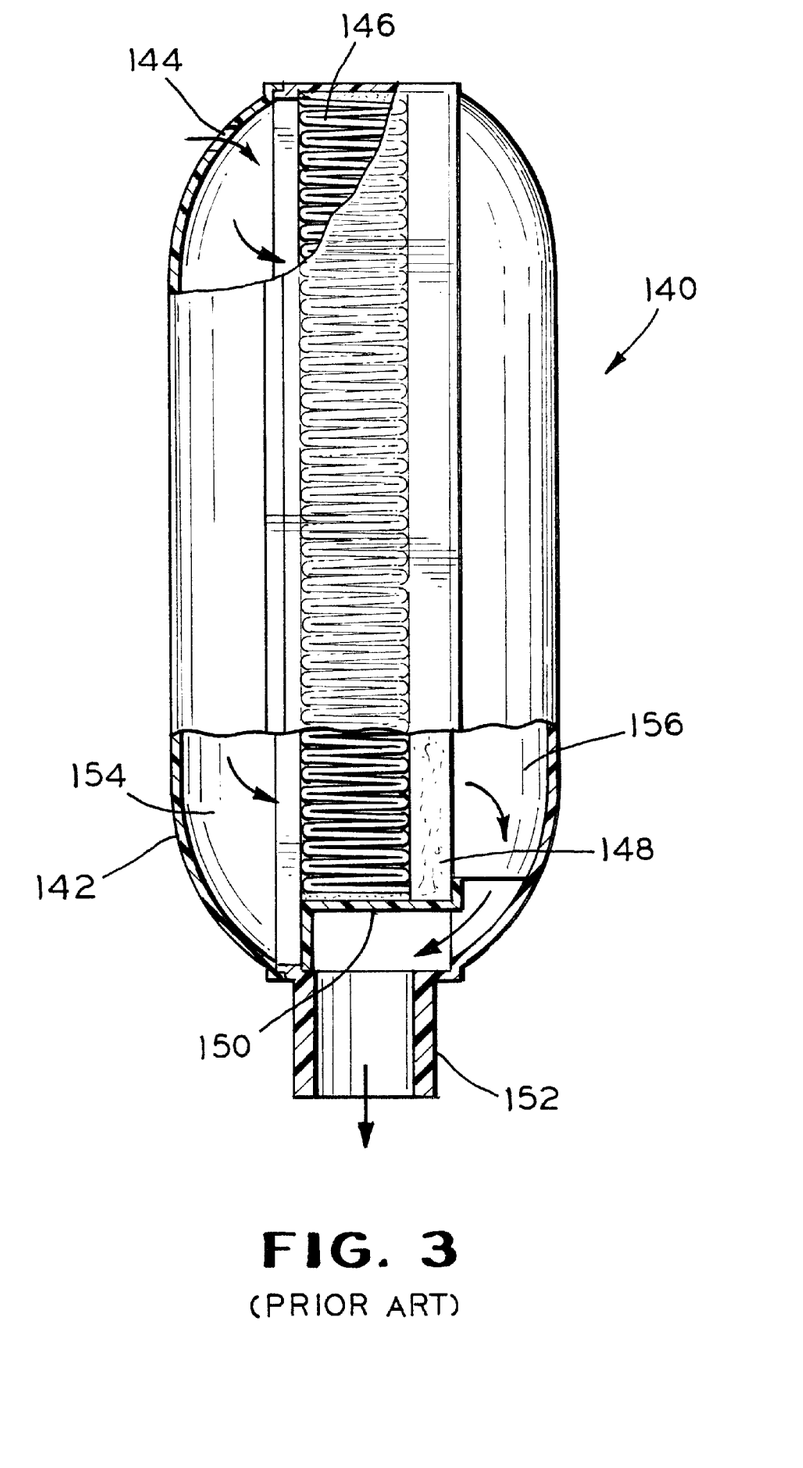
FIG. 3 is an elevational view, partially cut away, of another known inlet filter of the prior art.

FIG. 3 represents an additional known device, manufactured by Porous Media and distributed by Invacare. This filter/silencer 140 includes a housing 142 with an arced top and bottom, and a rectangular central section. This filter contains an inlet opening 144 leading to a first open chamber or plenum 154. From this open chamber 154 air flows into a HEPA filter 146 and from the HEPA filter 146 through a felt pad 148 and into a second open chamber or plenum 156. A restrictor plate 150 forces the air to proceed through both the HEPA filter 146 and the felt pad 148. From this second open chamber 156, air flows through an outlet 152.

Figure 4:
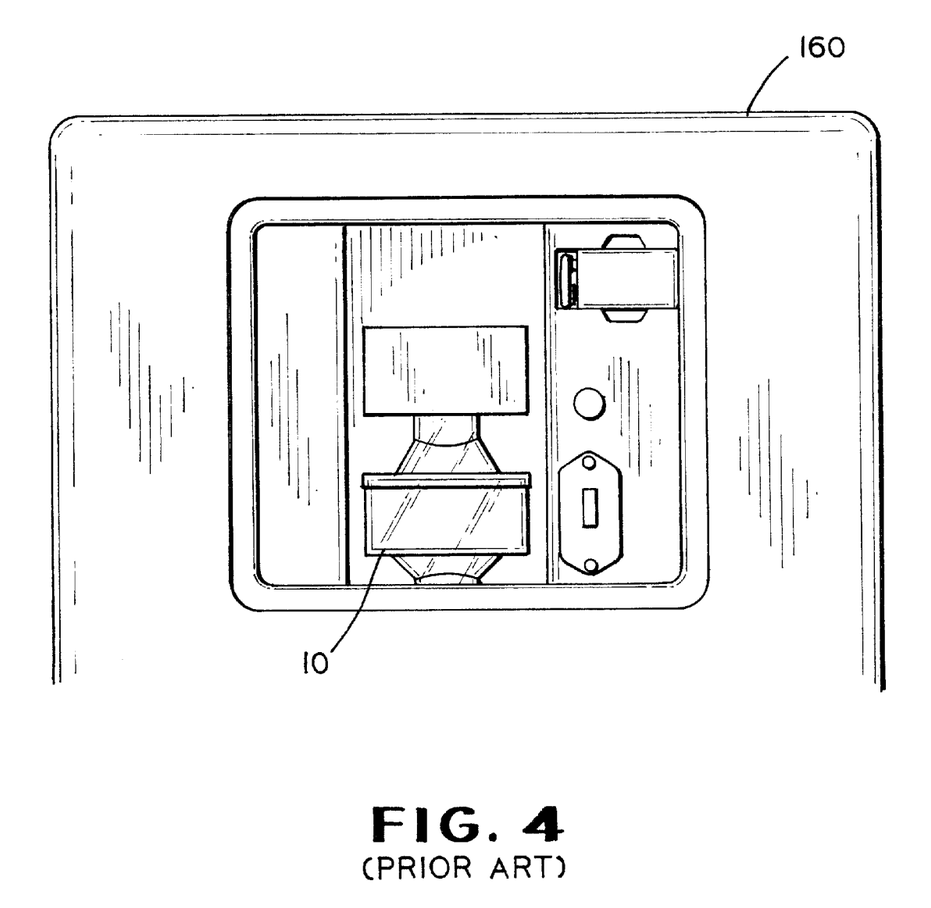
FIG. 4 is a partial elevational view of an oxygen concentrator showing the position of a known inlet filter.

FIG. 4 is an illustration of an oxygen concentrator showing where an inlet filter/silencer 10 would fit into the oxygen concentrator 160.

Figure 5:
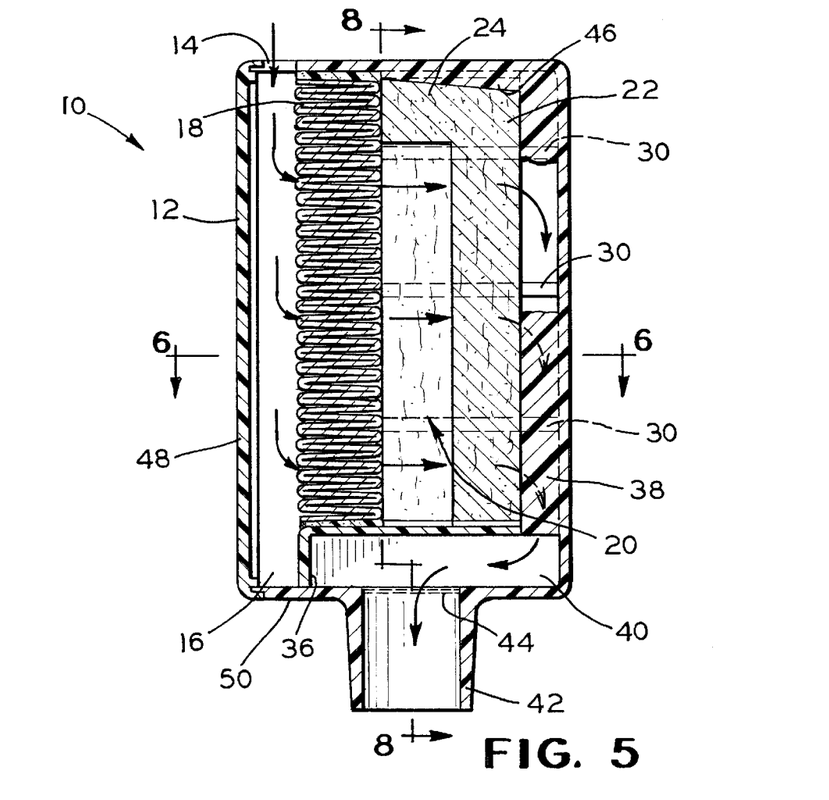
FIG. 5 is an elevational sectional view of an embodiment of the present invention.

FIG. 5 illustrates a filter/silencer 10 embodying the construction of the present invention. The filter 10 includes a basically rectangular housing 12. For ease of manufacture, the housing 12 can be made of separate sections, here shown as first and second sections, 48 and 50, respectfully. The sections 48, 50 can then be secured together to form an airtight seal by, for example, sonic welding. In the housing 12 is an air inlet 14, preferably in the form of a slot located in the top of the housing 12. Air entering the filter 10 through the air inlet 14 first enters a first chamber 16. From first chamber 16, air passes into a HEPA filter 18. After passing through the HEPA filter 18, the air enters second chamber 20. This second chamber 20 is surrounded on the side opposite the HEPA filter 18 by a first felt pad 22, and on the sides perpendicular to the HEPA filter 18 by second and third felt pads, 26 and 28, respectively (see FIG. 6), to form a sound damping layer adjacent said second chamber 20. Additionally, a fourth felt pad 24 lines the top of the chamber 20. Thus, in this embodiment, the chamber 20 is surrounded on top by the HEPA filter 18 and on three sides and the bottom by felt pads 22, 24, 26, and 28.

A baffle or restrictor plate 36 is positioned to direct the flow from the first chamber 16 into the HEPA filter 18, and through the felt pads into second chamber 20. From the second chamber 20, air flows into a bottom chamber 40, on the opposite side of the restrictor plate 36, and is then directed to an outlet 42. The restrictor plate 36 thus preferably has an L shape, with the end on the short side of the L abutting the housing 12 on the end opposing the inlet 14. The long side of the L then extends transversely across the a portion of the housing 12, and separates the HEPA filter 18, the second chamber 20, and the felt pads (22,24,26, and 28) from being in direct fluid communication with the bottom chamber 40. Instead, air is directed by the restrictor plate 36 into the lower chamber 38, which chamber 38 is the only area in direct fluid communication with the bottom chamber 40.

Across the mouth of the outlet 42 can be an optional, additional mesh filter 44 (FIG. 5). The outlet 42 can then be connected to the inlet of an oxygen concentrator (for example as illustrated in FIG. 4). This additional mesh filter 44 can be useful, as the felt pads can release fibers into the airflow. These fibers could have deleterious effects on the recipient of air from the oxygen concentrator and thus this additional mesh filter 44 can be useful to further clean the airflow.

While felt pads are preferable to be used as sound damping filters in the present invention, other materials with similar air flow and sound absorptive properties are also suitable for use in the present invention. For example, urethane foam materials would provide flow characteristics and noise reduction, which would be suitable for the intended use of the product. Whether felt pads or other materials are used, to form the sound damping layers, the layers may be of unitary or multi-piece construction.

Figure 6:
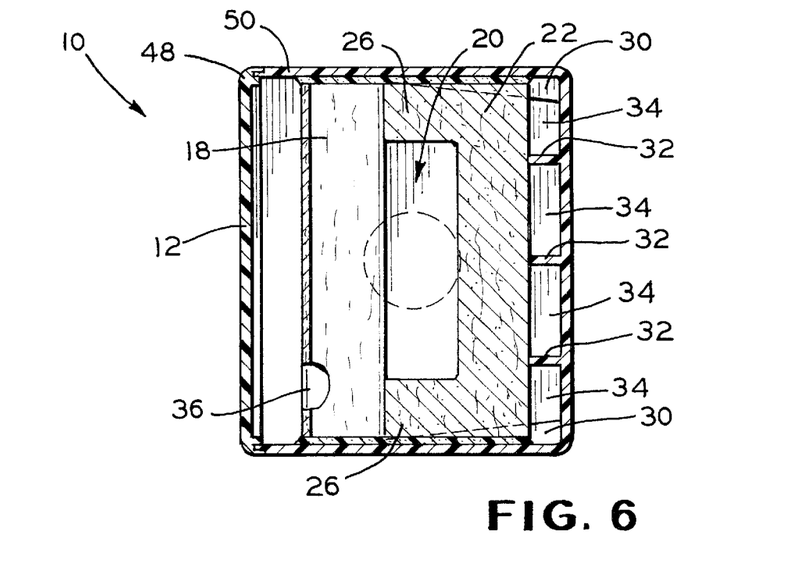
FIG. 6 is a sectional view, taken in the direction of the arrows, along the section line 6—6 of FIG. 5.

Within the housing 12 are also optional side supports 30. In the embodiment illustrated, three supports are positioned on each side wall of the housing 12 to provide additional support for the felt pads and the HEPA filter. These supports can be integral with the housing or can be separate pieces added later. The supports 30, as depicted in FIG. 6, can be tapered so that the widest point is in abutting the side wall in lower chamber 38. Additionally, the supports 12 can taper off somewhere adjacent felt pads 26,28.

Similarly, end supports 46 (see FIG. 10) can also be provided to support the felt pads. In the embodiment shown, three end supports 46 are provided to support the felt pads. These supports can be designed similarly to the side supports, thus having their widest point abutting the wall of the housing 12 and the narrowest point beside the felt pad.

In an alternative embodiment (illustrated in FIG. 9), an additional felt pad 28A is also disposed below the chamber 20, abutting the restrictor plate 36. In this embodiment, the second chamber 20 is enclosed on one side by the HEPA filter 18, and on all other sides by felt pads 22, 24, 26, 28, 28A.

FIG. 6 illustrates a sectional view along line 6—6 of FIG. 5. This figure illustrates separators 32 which are positioned between the felt pad and the housing in the lower chamber 38. These separators 32 serve to both provide structural support to the felt pad, and also to separate the chamber 38 into separate air flow channels 34. These separated flow channels 34 tend to improve the flow characteristics of air through the filter/silencer 10 and also serve to further reduce sound produced by the oxygen concentrator.

Figure 7:
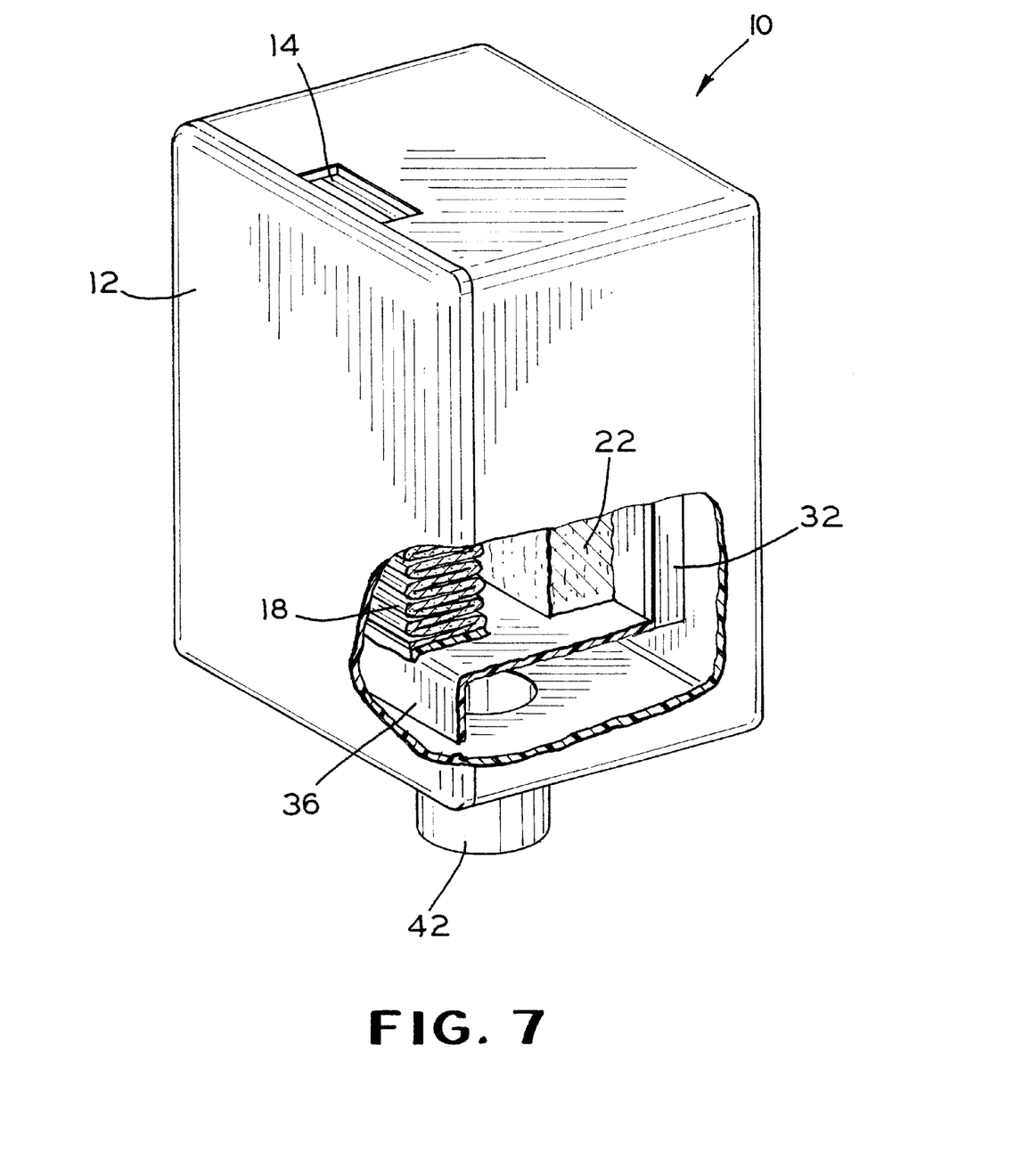
FIG. 7 is a isometric view of an embodiment of the present invention, with a cut-away portion.

FIG. 7 shows a perspective view of the embodiment described above, with a portion of the housing 12 cut away to reveal the interior of the filter/silencer 10. This figure clearly shows the separation between the HEPA filter 18 and the first felt pad 22 opposite the HEPA filter, thus illustrating the location of the second chamber 20. As can also be seen from this figure, the air inlet 14 is preferably in the form of a slot in the housing 12.

Figure 8:
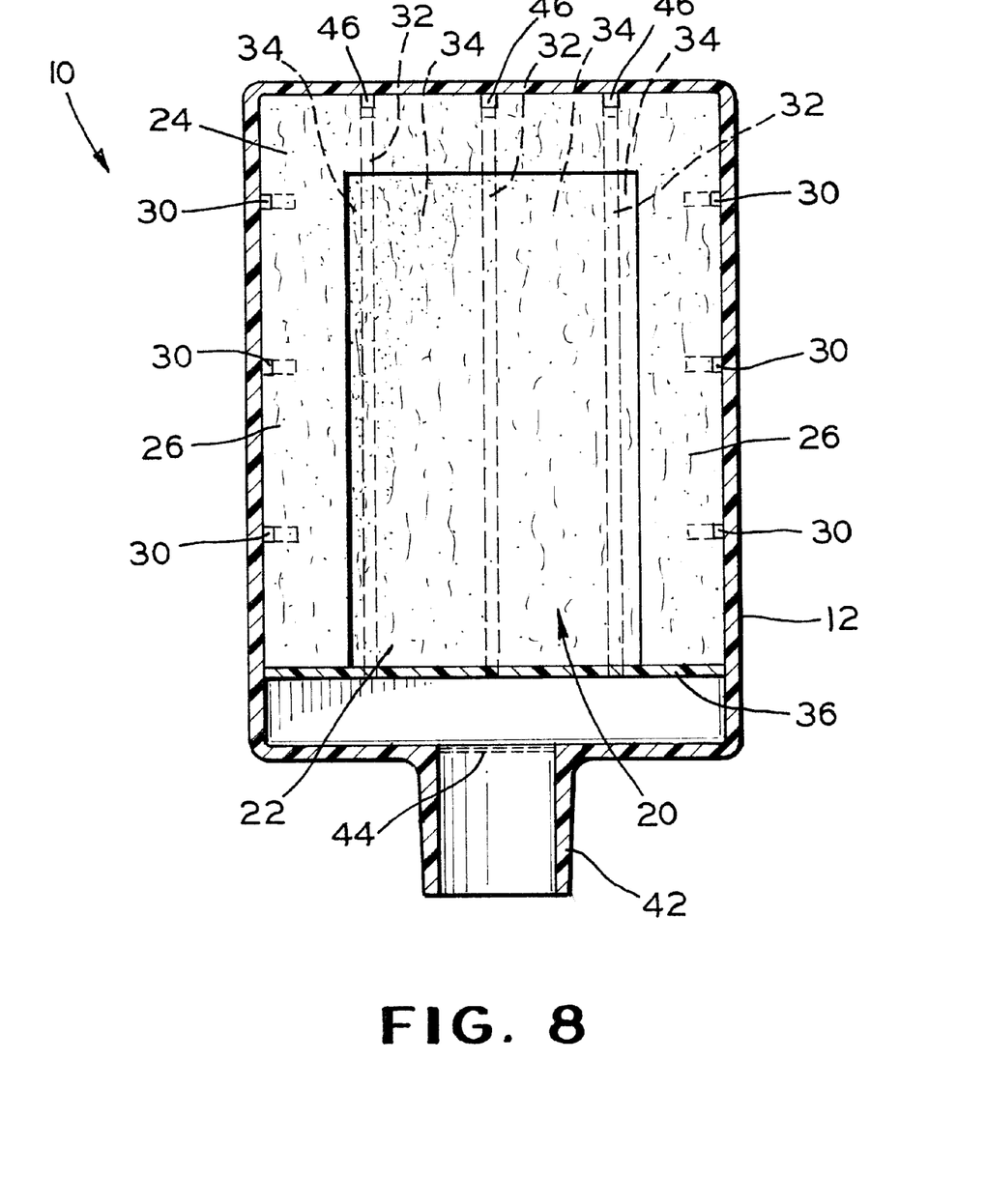
FIG. 8 is a sectional view, taken in the direction of the arrows, along the section line 8—8 of FIG. 5.

FIG. 8 illustrates a further sectional view of the embodiment of the present invention depicted in FIG. 6, taken in the direction of the arrows, along the section line 8—8. This view shows the open chamber 20 bounded on three sides and the bottom by felt pads 22, 24, 26, 28. The other face is bounded by the restrictor plate 36. The HEPA filter 18 (see FIG. 4) would bound the other side to form the enclosed second chamber 20.

The felt pads 22, 24, 26, 28 serve primarily as sound damping material to minimize the noise emissions from the oxygen concentrator. Sound waves are prone to reflection and will tend to reflect and reverberate off of hard surfaces, such as those of the housing of the present invention. Soft surfaces, such as the felt pads described above, tend to be sound absorptive, and minimize the reflections and thus the reverberations of sound waves. In the embodiment shown in FIG. 5, only one sound reflective surface faces the chamber 20. This surface is formed by a part of the restrictor plate 36, and is opposed to fourth felt pad 24. Thus, sound reflecting off of the reflective surface of this embodiment will tend reflect toward a felt covered surface and will be dampened or absorbed. Thus, sound reverberations will be damped or muted.

Figures 9, 10:
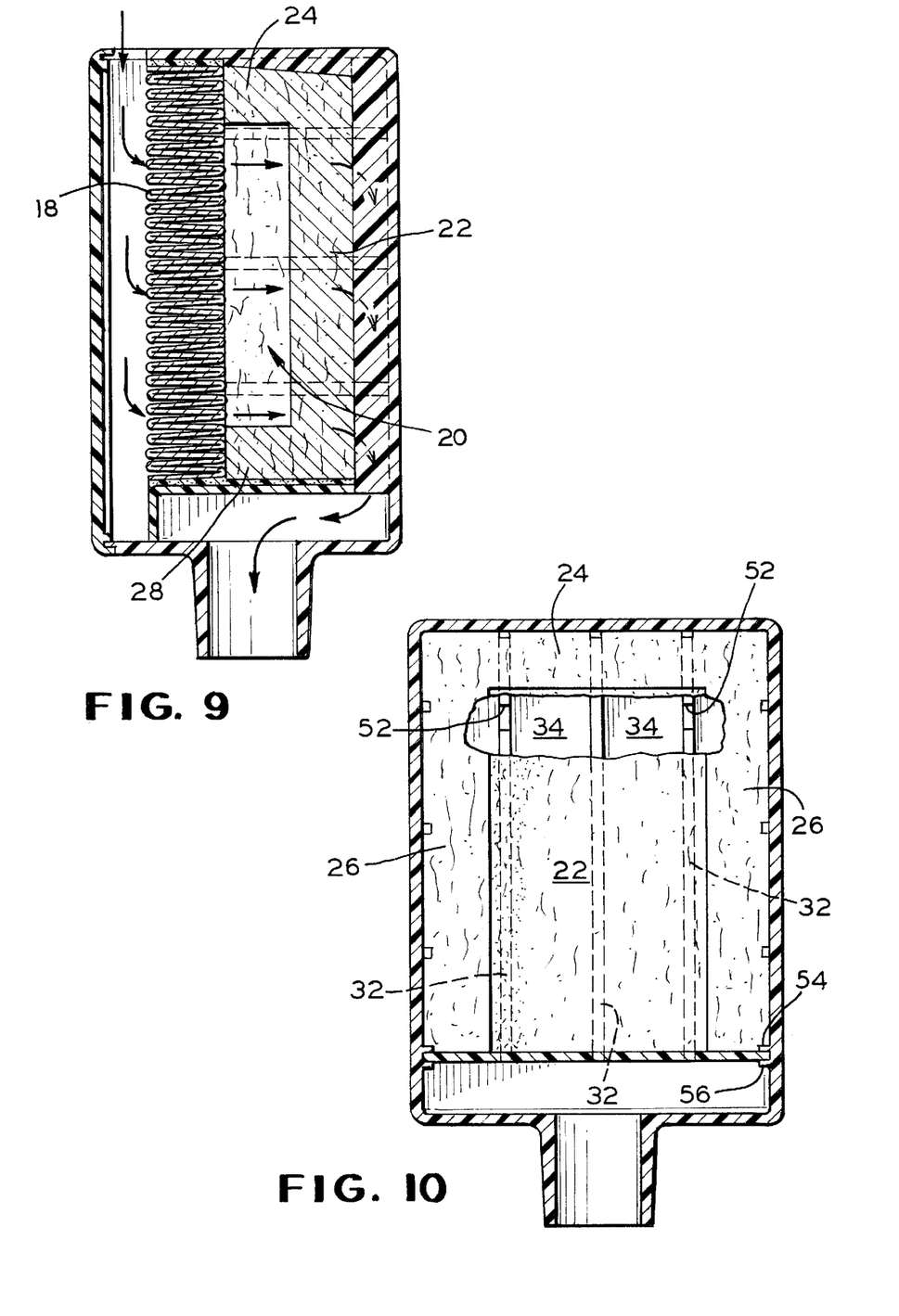
FIG. 9 is similar, in part, to FIG. 5, showing an alternative embodiment of the present invention.
FIG. 10 shows a top plan sectional view of the present invention with a portion of the filter media cut-away to show the flow channels.

FIG. 10 illustrates an alternative embodiment of the flow channels 34 and separators 32 shown in FIG. 6. In the preferred embodiment shown in FIG. 10, the outer pair of separators 32 have notches 52 allowing flow of fluid between channels 34. The notches 52 improve the flow characteristics of the air leaving the felt pads and can improve the noise reducing properties.

In order to facilitate construction of the filter/silencer 10, ridges 54 and 56 can be designed into the housing 12. These ridges 54, 56 can allow the restrictor plate 36 to be installed subsequent to manufacture of the housing. The restrictor plate 36 can fit firmly between the ridges 54, 56 and, thus, be held firmly in place. Preferably, ridges 54 are longer than ridges 56, so that the short leg of the L shaped restrictor plate 36 can fit over the shorter ridges 56.

The housing and the restrictor plate can preferably be made of the same material, for example, plastics such as acrylics, polyethylene, K-Resin are especially suitable, although any commonly used injection moldable material may be used. Examples of suitable materials would be Cyrolite™ or Cyrovu™. The front mesh filter 44 is preferably made of materials such as polypropylene, polyethylene, nylon or glass fibers.

HEPA filters suitable for use with the present invention would be those normally associated in the art with oxygen concentrators. Typically filtering properties of 99.97 retention on 0.3 mm particles would be desirable.

The embodiments depicted above are also advantageous in that the surface area of felt relative to the surface are of the HEPA filter is increased over that known in the art. This is because of the additional felt padding on the walls of the housing 12. In at least one embodiment of the present invention, there can be up to about 11 square inches, or more, of total surface area of felt. This greater surface area allows both additional sound damping surface and greater area for airflow, thus also contributing to a lesser pressure loss of flow through the filter/silencer. Additionally, the greater surface area of felt will decrease the frequency with which the filter needs to be changed (because of clogging), thus decreasing maintenance time and expense.

In a preferred embodiment of the present invention, the HEPA filter provides a filtering area of about 120 square inches.

In another preferred embodiment of the present invention, the total surface area of the sound absorbing layers is about 11 square inches.

It is to be understood that the form of the invention herein shown and described is to be taken as a preferred embodiment only, and that various changes in the size, shape and arrangement of parts, as well as various procedural changes may be made without departing from the spirit of the invention or the scope of the following claims.

What is claimed is:

1. An inlet silencer/filter for an oxygen concentrator, comprising:

a housing with an inlet and an outlet;

a first chamber in said housing disposed adjacent to said inlet and being in fluid communication with said inlet;

a HEPA filter disposed inside said housing and adjacent to said first chamber, said HEPA filter being in fluid communication with said first chamber;

a second chamber disposed inside said housing and adjacent said HEPA filter, said second chamber having a top and a bottom, and sides connected between said top and said bottom, and being in fluid communication with said HEPA filter;

a sound damping layer disposed inside said housing and adjacent said second chamber, said sound damping layer being in fluid communication with said second chamber;

an additional sound damping layer disposed around at least three sides of said second chamber, separating said second chamber from said housing to minimize noise from said inlet filter/silencer;

a lower chamber in said housing, said lower chamber being disposed adjacent said sound absorbing material, on the side opposing said second chamber, and said lower chamber being in fluid communication with said sound absorbing layer;

a flow restrictor plate disposed inside said housing and adjacent said HEPA filter and said sound absorbing layer, said flow restrictor plate being positioned to force air to flow from said inlet through said first chamber, said HEPA filter, said second chamber, said sound absorbing layer and said lower chamber; and a bottom chamber in said housing, said bottom chamber being in fluid communication with said lower chamber and said outlet, to allow air to exit from said inlet filter/silencer.

2. The inlet silencer/filter according to claim 1, further comprising a plurality of baffle plates, said plurality of baffle plates being disposed in said lower chamber to divide said lower chamber into a plurality of flow channels for air exiting said sound absorbing layer.

3. The inlet silencer/filter according to claim 1, wherein said sound absorbing layer is made of felt.

4. The inlet silencer/filter according to claim 1, wherein said housing is made of polystyrene.

5. The inlet silencer/filter according to claim 1, wherein said housing comprises two parts, which are sonic welded together.

6. The inlet silencer/filter according to claim 1, wherein said HEPA filter provides a filtering area of about 120 square inches.

7. The inlet silencer/filter according to claim 1, wherein said sound absorbing layer and said additional sound absorbing layer provide a surface area of about 11 square inches.

8. The inlet silencer/filter according to claim 1, further comprising an outlet filter disposed across said outlet to prevent fibers from said sound absorbing material from exiting said inlet silencer/filter.

9. The inlet silencer/filter according to claim 1, further comprising a plurality of tapered side supports, said tapered side supports being disposed on the inside of said housing on opposite sides of said housing to support said sound absorbing layer, said tapered side supports extending from the side of said housing parallel to said sound absorbing layer and nearest to said sound absorbing layer and extending transverse to said sound absorbing layer.

10. The inlet silencer/filter according to claim 1, further comprising a plurality of tapered end supports, said tapered end supports being disposed inside said housing on the end of said housing to support said sound absorbing layer, said tapered side supports extending from the side of said housing parallel to said sound absorbing layer and nearest to said sound absorbing layer and extending transverse to said sound absorbing layer.

11. The inlet silencer/filter according to claim 2, wherein said plurality of baffle plates comprises 3 baffle plates, said three baffle plates being disposed parallel to one another and dividing said lower chamber into four parallel flow channels.

12. The inlet silencer/filter according to claim 11, wherein the two outer baffle plates of said three baffle plates each comprise an opening to allow flow of air between said flow channels.

13. An inlet silencer/filter for an oxygen concentrator, comprising:

a housing with an inlet and an outlet;

a first chamber in said housing disposed adjacent to said inlet and being in fluid communication with said inlet, said housing forming five sides of said first chamber;

a HEPA filter disposed inside said housing and adjacent to said first chamber, said HEPA filter being in fluid communication with said open chamber and said HEPA filter forming at least part of one side of said first chamber;

a second chamber disposed inside said housing and adjacent said HEPA filter, said second chamber being in fluid communication with said HEPA filter and said HEPA filter forming one side of said second chamber;

a sound damping layer disposed inside said housing and adjacent said second chamber, said sound damping layer being in fluid communication with said second chamber and forming a side of said second chamber opposite the side formed by said HEPA filter;

an additional sound damping layer disposed around at least three sides of said second chamber, separating said second chamber from said housing to minimize noise from said inlet filter/silencer and forming at least three sides of said second chamber;

a lower chamber in said housing, said lower chamber being disposed adjacent said sound absorbing material, on the side opposing said second chamber, and said lower chamber being in fluid communication with said sound absorbing layer, said sound absorbing layer forming one side of said lower chamber and said housing forming the remaining sides of said lower chamber;

a flow restrictor plate disposed inside said housing and adjacent said HEPA filter and said sound damping layer, said flow restrictor plate being positioned to force air to flow from said inlet through said first chamber, said HEPA filter, said second chamber, said sound damping layer and said lower chamber; and a bottom chamber in said housing, said bottom chamber being in fluid communication with said lower chamber and said outlet, to allow air to exit from said inlet filter/silencer, said flow restrictor plate forming at least part of two sides of said bottom chamber and said housing forming four sides of said second chamber.

* * * * *